United States Patent Office 3,037,291
Patented June 5, 1962

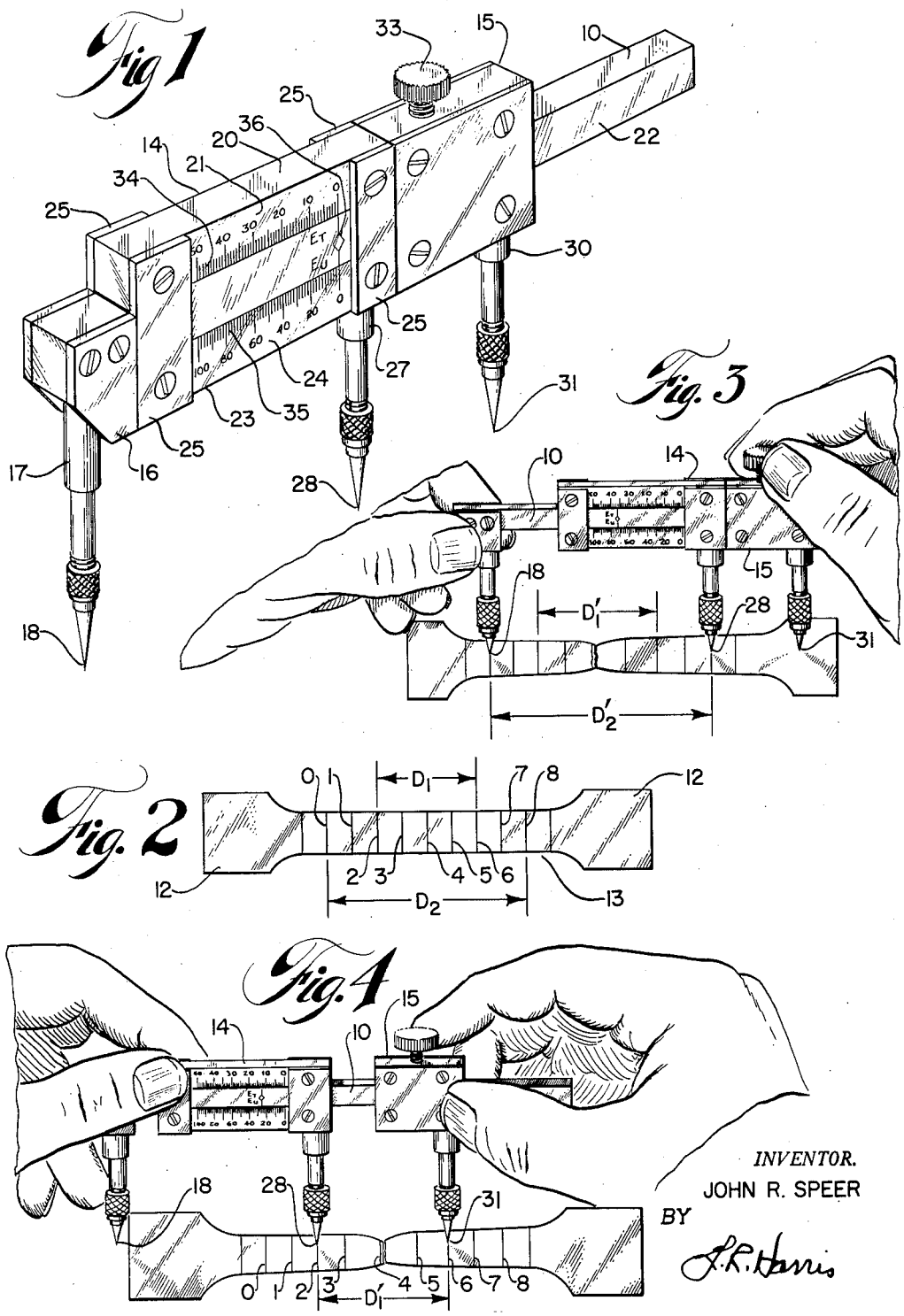

3,037,291
METHOD AND APPARATUS FOR MEASURING UNIFORM ELONGATION
John R. Speer, Pittsburgh, Pa., assignor to Jones & Laughlin Steel Corporation, Pittsburgh, Pa., a corporation of Pennsylvania
Filed Apr. 30, 1956, Ser. No. 581,729
2 Claims. (Cl. 33—143)

This invention is related to the physical testing of ductile materials, such as metals, and is more particularly concerned with method and apparatus for measuring the so-called uniform elongation of a ductile specimen of material which has been stressed to the breaking point in tension.

In the physical testing of metals it is quite common to provide and test specimens to determine the ultimate tensile strength of the material. All ductile materials elongate appreciably before breaking when so tested and it is quite common to measure the percentage elongation of such specimens. In the case of flat materials such as sheet or strip which are to be subjected to considerable deformation, such as a deep draw, the elongation is some indication of the deformability of the material. The gross or over-all elongation, which is quite simply measured by scribing a pair of gauge marks on the specimen at a known distance apart so that the break will be between them and then measuring the increased distance between these gauge marks, does not, however, give a true picture of the ductility of the specimen. This is because the specimen just before breaking contracts laterally, or "necks down," at the region of the break and elongates quite appreciably in this region of reduced cross sectional area. It would be highly desirable, particularly in the testing of specimens of thin flat material, to exclude this local elongation due to necking down from the measured elongation and so obtain what is called the uniform elongation only, but prior to my invention to be described, no simple method of determining the uniform elongation was known or apparatus capable of measuring it readily.

It is, therefore, an object of my invention to provide a relatively simple method of measuring the uniform elongation of a specimen broken in tension. It is another object to provide such a method well adapted to specimens of thin flat material. It is another object to provide relatively simple apparatus for making such determination. Other objects will appear in the course of the following description of my invention.

The accompanying figures illustrate both the method and apparatus of my invention. FIG. 1 is an isometric sketch of the apparatus of my invention. FIG. 2 is a conventional tensile test specimen before breaking prepared for the practice of the method of my invention. FIG. 3 illustrates my apparatus applied to a broken tensile specimen and shows one step in the use of such apparatus. FIG. 4 also illustrates my apparatus as applied to a broken tensile specimen and shows a second step in the use of such apparatus.

Uniform elongation is the elongation per unit length, expressed either as a decimal fraction or a percentage, and is considered to be the same measured over any gauge length. The method of my invention is based on the assumption that the elongation due to necking down of a specimen is confined to a region relatively close to the actual break. FIG. 2, as has been mentioned, illustrates a tensile test specimen prepared for breaking and for the practice of my invention. A specimen cut from thin flat material of uniform thickness is illustrated, but my invention is not limited to such a specimen. End sections 12—12 are of appreciably greater width than center section 13. The width of center section 13 is many times the thickness of the specimen. The center section 13 is scribed with parallel transverse gauge marks uniformly spaced. Nine such gauge marks are numbered 0 through 8, successively, from left to right in FIG. 2. The distance between successive gauge marks 1 and 2, 2 and 3, and so on, may conveniently be one-quarter inch.

The specimen so prepared is broken in the usual manner by the application of tensile forces to its ends 12—12. The two pieces of the broken specimen are then pierced together, as is shown in FIGS. 3 and 4. A pair of gauge marks is chosen which is, as far as possible, symmetrical with respect to the break and includes substantially all the elongation due to necking of the specimen. Such a pair of marks is 2 and 6. A second pair of marks is then chosen symmetrically disposed with respect to the first pair but having a spacing on the unbroken specimen greater than that between the marks of the first pair. Such a second pair is 0 and 8.

The uniform elongation may be determined by the difference of two linear measurements, as will now be shown. Let $D_1$ = distance between marks 2 and 6 on the unbroken specimen
$D_1'$ = distance between marks 2 and 6 on the specimen after breaking
$D_2$ = distance between marks 0 and 8 on the unbroken specimen
$D_2'$ = distance between marks 0 and 8 on specimen after breaking
$E_u$ = uniform elongation expressed as a decimal fraction
$N$ = total elongation due to necking then (I) $\qquad D_2' = D_2(1+E_u) + N$
(II) $\qquad D_1' = D_1(1+E_u) + N$ If $N$ is eliminated from Equations I and II $$D_2' = D_2(1+E_u) + D_1' - D_1(1+E_u)$$

and (III) $\qquad E_u = \dfrac{(D_2' - D_2) - (D_1' - D_1)}{D_2 - D_1}$

If the two pairs of gauge marks are selected so that $$D_2 = 2D_1$$

and $D_2'$ is written as $D_2 + \Delta D_2$ where $$\Delta D_2 = D_2' - D_2$$

and $D_1'$ is written as $D_1 + \Delta D_1$ where $$\Delta D_1 = D_1' - D_1$$

(IV) $\qquad E_u = \dfrac{\Delta D_2 - \Delta D_1}{D_1}$

If the first pair of gauge marks is chosen one inch apart, $$D_1 = 1$$

and $$E_u = \Delta D_2 - \Delta D_1$$

or (V) $\qquad$ Percent $E_u = (\Delta D_2 - \Delta D_1) \times 100$

Thus I can obtain the percentage uniform elongation of a specimen by simple measurement. Lengths $D_1'$ and $D_2'$ can be measured and substituted in Equation III, or the increases in length $\Delta D_1$ and $\Delta D_2$ measured and substituted in Equation IV or V. These measurements can be made with a ruler, graduated dividers, or in other known ways.

I have likewise invented a relatively simple apparatus for directly measuring uniform elongation by the method above set out, and symbolized in Equation V. My apparatus comprises an elongated prismatic beam 10 provided with a first slider 14 and a second slider 15. One end of beam 10 has attached thereto a stop 16 and a rod 17 projecting at right angles to the axis of beam 10 and terminating at its outer end at a point 18. First slider 14 is formed with an upper bar 20 having a flat face 21 parallel to a face 22 of beam 10 and a lower bar 23 likewise having a flat face 24 parallel to face 22 of beam 10. Upper and lower bars 20 and 23 are connected by cross pieces 25—25 which enclose beam 10. Lower bar 23 carries a rod 27 projecting at right angles thereto in the same direction as rod 17 and parallel to such rod. Rod 27 terminates at its outer end at a point 28. Second slider 15 encloses bar 10 and carries a rod 30 projecting from it in the same direction as rods 17 and 27 and parallel to these rods. Rod 30 terminates at its outer end at a point 31. Slider 15 is also provided with a thumb screw 33 so that it may be locked on beam 10.

First slider 14 is dimensioned so that when it is positioned against stop 16 of beam 10 the distance between points 18 and 28 is exactly two inches. Second slider 15 is dimensioned so that when it is positioned against the end of first slider 14 the distance between points 28 and 31 is exactly one inch. Face 21 of upper bar 20 of first slider 14 is provided with a scale 34 one inch long which is subdivided into fifty equal parts. Flat face 24 of lower bar 23 of slider 14 is likewise provided with a scale 35 one inch long which is graduated into 100 equal parts. The zero of both scales 34 and 35 adjoins the end of first slider 14 which is remote from stop 16. Beam 10 carries on its face 22 an index line 36 which corresponds with the zeros of scales 34 and 35 when first slider 14 is positioned against stop 16.

The operation of my apparatus will now be explained with particular reference to FIGS. 3 and 4. The broken tensile specimen is pieced together, as previously described. Point 18 of my apparatus is set at gauge mark zero and both sliders are moved along beam 10 until point 28 reaches gauge mark 8. In this position of my apparatus index 36 of beam 10 reads directly the total elongation of the specimen over the initial two inch gauge length on scale 34 of first slider 14. With points 18 and 28 set in gauge marks zero and 8 as mentioned, thumb screw 33 of second slider 15 is tightened so that the second slider is locked to beam 10 at a position immediately adjacent that of first slider 14. FIG. 3 illustrates my apparatus in this position. My apparatus is then lifted from the specimen and moved until point 31 engages gauge mark 6. First slider 14 is then moved away from second slider 15 until point 28 is set on gauge mark 2. In this position of my apparatus index 36 of beam 10 reads directly the percentage uniform elongation on scale 35 of first slider 14.

I claim:

1. The method of determining the percentage uniform elongation of a specimen of ductile material which has been inscribed with two pairs of spaced-apart gauge marks, the marks of each pair being spaced apart known distances, the first pair being centrally located between the second pair and the gauge marks being symmetrically located with respect to the expected break in the specimen, which specimen is then broken by applying thereto increasing tensile load whereby the specimen is elongated and caused to neck-down and break in the region enclosed between the first pair of gauge marks, and then pieced together, comprising moving a first and a second point with respect to each other along a graduated scale into contact with the second pair of gauge marks on the elongated and pieced-together specimen so that the distance between the first and second points is indicated on the scale, then moving the second point along the scale with respect to a third point and bringing the second point and the third point into contact with the first pair of gauge marks on the elongated and pieced-together specimen so that the distance between the second point and the third point is subtracted on the scale from the previously indicated distance between the first and second points, the scale being graduated so that the remaining distance on the scale between the first and second points indicates directly the percentage uniform elongation over the gauge length defined by the second pair of gauge marks.

2. The method of determining the percentage uniform elongation of a specimen of ductile material which has been inscribed with two pairs of spaced-apart gauge marks, the marks of each pair being spaced apart known distances, the first pair being centrally located between the second pair and the gauge marks being symmetrically located with respect to the expected break in the specimen, which specimen is then broken by applying thereto increasing tensile load whereby the specimen is elongated and caused to neck-down and break in the region enclosed between the first pair of gauge marks, and then pieced together, comprising moving with respect to each other along a graduated scale a first and a second point having a minimum spacing equal to the spacing between the second pair of gauge marks on the specimen before elongation so that the points are brought into contact with the second pair of gauge marks on the elongated and pieced-together specimen and the increase in spacing between the points is indicated on the scale, then moving the second point along the scale with respect to a third point having a minimum spacing from the second point equal to the spacing between the first pair of gauge marks on the specimen before elongation and bringing the second and third points into contact with the first pair of gauge marks on the elongated and pieced-together specimen so that the increase in spacing between the second and third points is subtracted on the scale from the previously indicated increase in spacing between the first and second points, the scale being graduated so that the remaining distance upon the scale between the first and second points indicates directly the percentage uniform elongation over the gauge length defined by the second pair of gauge marks.

References Cited in the file of this patent

UNITED STATES PATENTS

| | | |
|---|---|---|
| 2,498,397 | Daly | Feb. 21, 1950 |
| 2,645,022 | Hart | July 14, 1953 |
| 2,700,825 | Sorensen | Feb. 1, 1955 |
| 2,724,964 | Singdale | Nov. 29, 1955 |
| 2,763,154 | Kohn et al. | Sept. 18, 1956 |
| 2,770,046 | Wichmann | Nov. 13, 1956 |

FOREIGN PATENTS

| | | |
|---|---|---|
| 287,002 | Great Britain | Mar. 15, 1928 |

OTHER REFERENCES

Publication: "The Making, Shaping and Treating of Steel," by Camp and Francis, Carnegie Steel Co., 5th edition (1940), pages 526–534. (Copy in Scientific Library, U.S. Patent Office.)